US010565900B2

(12) United States Patent
Mattausch et al.

(10) Patent No.: US 10,565,900 B2
(45) Date of Patent: Feb. 18, 2020

(54) RAY-TRACING METHODS FOR REALISTIC INTERACTIVE ULTRASOUND SIMULATION

(71) Applicant: EIDGENOESSISCHE TECHNISCHE HOCHSCHULEZURICH (ETHZ), Zurich (CH)

(72) Inventors: Oliver Mattausch, Zurich (CH); Orcun Goksel, Zurich (CH); Maxim Makhinya, Schlieren (CH)

(73) Assignee: VIRTAMED AG, Schlieren (CH)

( * ) Notice: Subject to any disclaimer, the term of this patent is extended or adjusted under 35 U.S.C. 154(b) by 213 days.

(21) Appl. No.: 15/697,084

(22) Filed: Sep. 6, 2017

(65) Prior Publication Data
US 2018/0068590 A1    Mar. 8, 2018

Related U.S. Application Data

(60) Provisional application No. 62/383,829, filed on Sep. 6, 2016, provisional application No. 62/448,661, filed on Jan. 20, 2017.

(51) Int. Cl.
*G09B 23/28* (2006.01)
*G06F 17/10* (2006.01)
(Continued)

(52) U.S. Cl.
CPC ........... *G09B 23/286* (2013.01); *G06F 17/10* (2013.01); *G06T 11/005* (2013.01); *G06T 15/06* (2013.01);
(Continued)

(58) Field of Classification Search
CPC ........ G09B 23/286; G09B 23/28; G09B 9/00; G06F 17/10; G06T 5/003; G06T 7/11;
(Continued)

(56) References Cited

U.S. PATENT DOCUMENTS 10,032,281 B1 * 7/2018 Ghesu ................. G06T 7/12
10,311,631 B2 * 6/2019 Petkov ................. G06T 15/06
(Continued)

FOREIGN PATENT DOCUMENTS

| WO | WO 2007/100263 | 9/2007 |
| WO | WO 2011/001299 | 1/2011 |
| WO | WO 2013/150436 | 10/2013 |

OTHER PUBLICATIONS

Law, Yuen C. et al., "Ultrasound Image Simulation with GPU-based Ray Tracing", Virtual Reality Group, RWTH Aachen University, Virtuelle und Erweiterte Realitat, 2011, pp. 183-194. (Year: 2011).*
(Continued)

*Primary Examiner* — Jose L Couso
(74) *Attorney, Agent, or Firm* — DLA Piper LLP (US)

(57) ABSTRACT

Stochastic ray-tracing methods such as Monte-Carlo ray-tracing may be adapted to provide more efficient and more realistic ultrasound imaging systems and methods. Many random ray paths that are perturbed according to a probability distribution may be generated until they converge to the correct solution. New surface thickness and roughness models enable to reproduce complex ultrasound interactions such as multiple reflections and refractions. The contribution of each ray path may be further weighted to better simulate a beamformed ultrasound signal. Tracing many individual rays per transducer element is easily parallelizable on modern GPU computing architectures.

18 Claims, 11 Drawing Sheets

(51) Int. Cl.
*G06T 11/00* (2006.01)
*G06T 15/06* (2011.01)
*G06T 15/08* (2011.01)
*G09B 9/00* (2006.01)

(52) U.S. Cl.
CPC .............. *G06T 15/08* (2013.01); *G09B 9/00* (2013.01); *G06T 2210/41* (2013.01); *G06T 2215/16* (2013.01)

(58) Field of Classification Search
CPC .. G06T 7/12; G06T 7/33; G06T 7/143; G06T 7/149; G06T 7/0012; G06T 11/003; G06T 13/20; G06T 15/02; G06T 15/06; G06T 15/08; G06T 19/00; G06T 2207/10132; G06T 2207/10136; G06T 2207/20104; G06T 2200/08; G06T 2210/41; G06T 2215/16; G06T 2219/008; G06K 9/3233; G06K 2209/05; G16H 30/40; G16H 50/20; G16H 50/30; G16H 80/00; A61B 8/00; A61B 8/44; A61B 8/461; A61B 8/466; A61B 8/469; A61B 8/483; A61B 8/52; A61B 8/58; A61B 8/587; Y10S 128/915; Y10S 128/916; G01N 29/4472; G01N 2015/142; G01N 30/76; G01N 2203/0658; G01S 15/8977; G01S 15/8993
See application file for complete search history.

(56) References Cited

U.S. PATENT DOCUMENTS

| | | | |
|---|---|---|---|
| 10,424,118 B2* | 9/2019 | Hannemann | A61B 5/00 |
| 2012/0189998 A1 | 7/2012 | Kruecker et al. | |
| 2015/0056591 A1 | 2/2015 | Tepper et al. | |
| 2017/0061681 A1* | 3/2017 | Engel | G06T 15/506 |
| 2017/0256090 A1* | 9/2017 | Zhou | G06T 15/08 |
| 2017/0348056 A1* | 12/2017 | Steinle | A61B 34/10 |
| 2018/0225862 A1* | 8/2018 | Petkov | G06T 15/06 |
| 2018/0293913 A1* | 10/2018 | Aguilar | G01N 29/4472 |

OTHER PUBLICATIONS

Robb, R. A. et al., "Interactive Display and Analysis of 3-D Medical Images", IEEE Transactions on Medical Imaging, Vo. 8, No. 3, Sep. 1989, pp. 217-226. (Year: 1989).*

Steen, Erik et al., "Volume rendering of 3D medical ultrasound data using direct feature mapping", IEEE Transactions on Medical Imaging, Vo. 13, No. 3, Sep. 1994, pp. 517-525. (Year: 1994).*

Benny Burguer, et al., "Teal-Time GPU-Based Ultrasound Simulation Using Deformable Mesh Models", IEEE Transactions on Medical Imaging, vol. 32, No. 3, pp. 609-618, (Mar. 2013).

International Search Report Issued in International Application No. PCT/EP2017/072108 dated Oct. 10, 2017.

Written Opinion Issued in International Application No. PCT/EP2017/072108 dated Oct. 10, 2017.

* cited by examiner

| Model | Spherical | Embryo | Heart |
|---|---|---|---|
| Triangles | 1.5K | 255K | 325K |
| Full depth | 6.0cm | 8.1cm | 6.0cm |
| Transducer freq. | 6.MHz | 7.MHz | 6.MHz |
| Transducer FOV | 99° | 75° | 90° |
| Scanlines | 128 | 192 | 128 |
| Axial res. | 1024 | 2048 | 1024 |
| Elevation layers | 5 | 5 | 5 |
| Axial Sampling | .06 mm | .04 mm | .06 mm |
| Scatterer res. | .03 mm | .03 mm | .03 mm |
| Animation | No | No | Yes |
| Frame times | | | |
| Deterministic | 107ms | 357ms | 201ms |
| MC 5 rays | 106ms | 303ms | 108ms |
| MC 15 rays | 139ms | 384ms | 128ms |
| MC 25 rays | 169ms | 476ms | 164ms |
| MC 40 rays | 232ms | 714ms | 190ms |
| Throughput (rays/sec) | | | |
| MC 5 rays | 45K | 15K | 44K |
| MC 15 rays | 104K | 37K | 113K |
| MC 25 rays | 142K | 50K | 146K |
| MC 40 rays | 166K | 54K | 202K |

Table 1: Statistics and timings for the used datasets.

| Level | Det | MC5 | MC15 | MC25 | MC40 |
|---|---|---|---|---|---|
| 7 | 233 ms | 300 ms | 392 ms | 472 ms | 705 ms |
| 10 | 299 ms | 298 ms | 384 ms | 471 ms | 709 ms |
| 12 | 357 ms | 303 ms | 384 ms | 476 ms | 714 ms |

Table 2: Comparison of rendering times for the embryo image using different recursion levels.

FIG. 6

Bone surface thickness = 0
FIG. 8A
Bone surface thickness =3mm
FIG. 8B
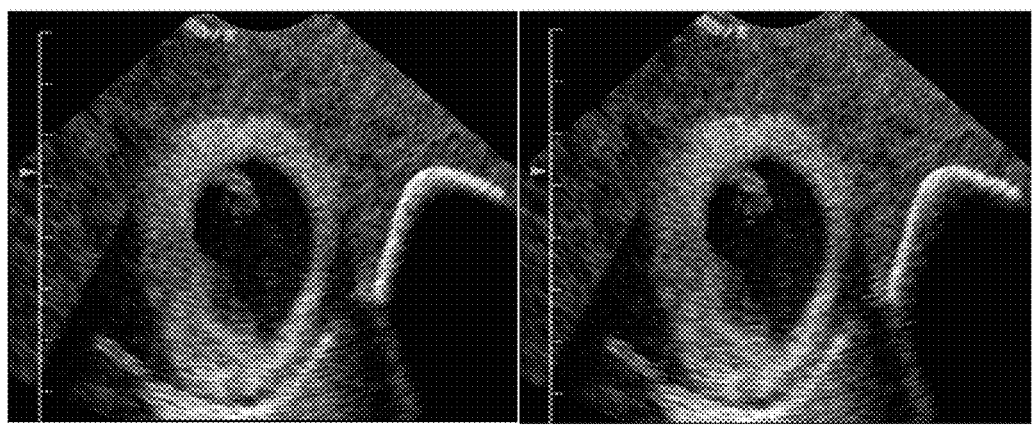
Bone surface thickness = 6mm
FIG. 8C
Bone surface thickness =9mm
FIG. 8D Deterministic (prior art)

$\cos^{inf}$ distribution $\cos^{100}$ distribution $\cos^{10}$ distribution

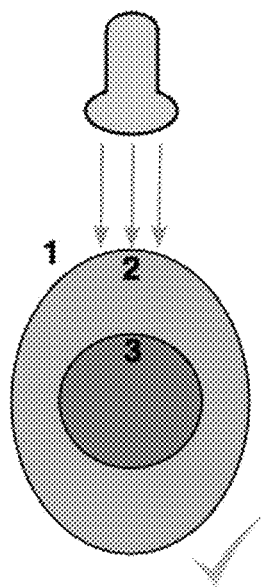
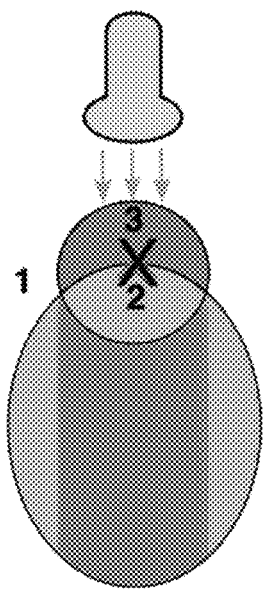
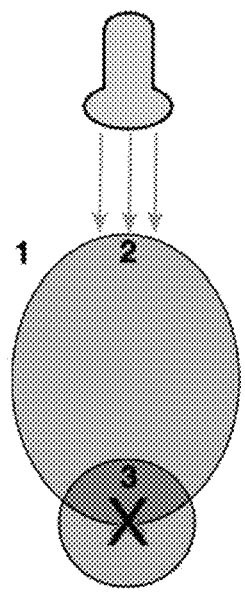
Non-intersecting
FIG. 11A
Error case 1
FIG. 11B
Error case 2
FIG. 11C
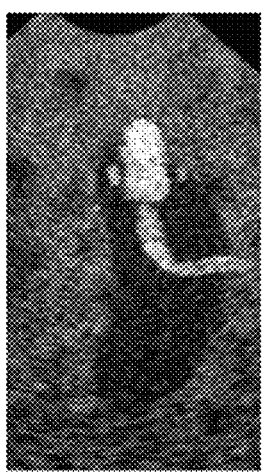
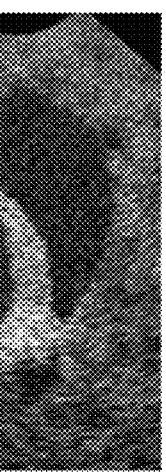
Error case 1 vs. robust
FIG. 11D
Error case 2 vs. robust
FIG. 11E

RAY-TRACING METHODS FOR REALISTIC INTERACTIVE ULTRASOUND SIMULATION

CROSS REFERENCE TO RELATED APPLICATIONS

This application claims the benefit of U.S. Provisional Application No. 62/383,829, filed Sep. 6, 2016, and U.S. Provisional Application No. 62/448,661, filed Jan. 20, 2017, which is incorporated by reference in their entireties.

FIELD OF THE INVENTION

Methods described herein relate to ultrasound image simulation in general, and more specifically to virtual reality ultrasound image modeling for ultrasound practice training simulation purposes, for example in the medical field.

BACKGROUND OF THE INVENTION

Medical Imaging Simulators

Application of ultrasound requires a high level of expertise both in manipulating imaging devices and also in analyzing and interpreting resulting images, for instance in the medical field for accurate diagnosis and intervention guidance. Learning the proper execution of this modality thus requires a lengthy training period for ultrasound specialists.

To facilitate the training of medical students and doctors, advanced medical procedure simulators may be used such as the one described in U.S. Pat. No. 8,992,230. Such simulators may be based on a virtual reality ("VR") and/or a mixed or augmented reality ("AR") simulation apparatus, by which the physician may experiment within a medical procedure scenario. The VR/AR system may compute and display a visual VR/AR model of anatomical structures in accordance with physician gestures and actions to provide various feedback, such as visual feedback. In a VR system, an entire image may be simulated for display to a user, and in an AR system, a simulated image may be overlaid or otherwise incorporated with an actual image for display to a user. Various patient models with different pathologies can be selected. Therefore, natural variations as encountered over the years by practicing medical staff can be simulated for a user over a compressed period of time for training purposes.

Ultrasound Imaging Simulation

Early ultrasound simulation solutions have been developed based on interpolative ultrasound simulation, such as for instance the method developed by O. Goksel and S. E. Salcudean as described in "B-mode ultrasound image simulation in deformable 3-D medium", *IEEE Trans Medical Imaging*, 28(11):1657-69, November 2009 [Goksel 2009]. Interpolative approaches can generally generate realistic images, but only in the absence of directional image artifacts and for images from limited fields of view. In order to handle different field-of-views and to better simulate certain artifacts, as required by certain ultrasound applications such as abdominal ultrasound, other approaches are needed.

Generative Simulation

Generative simulation, such as wave-based or ray-based ultrasound simulation, aims at emulating the ultrasonic signal that would be registered by a transducer position/orientation, using a combination of analytical and numerical solutions in real-time. However, simulating all possible ultrasound-tissue interaction phenomena is still an unsolved theoretical problem. For instance, the ultrasound texture (speckles) is a result of constructive and destructive interference of ultrasonic waves mainly scattered by sub-wavelength particles, such as cell nuclei, other organelles, etc. However, no known method can observe a sufficiently large tissue region (40-150 mm for OB/GYN ultrasound examination) in such fine detail with cellular structures.

An ultrasound transducer consists of several (e.g., 128 or 512) piezoelectric elements that can both transmit and receive ultra-sound, through conversion between electricity and vibration. The transmitted pressure wave (ultrasound) then interacts with anatomical structures with different acoustic impedances, where any reflected signal is again digitized by the same elements to be used for generating an image of the underneath tissue. Ultrasound (US) interaction with tissue happens in two different ways:

On the one hand, structures much smaller than the US wavelength ($\approx$300 vm) absorb US energy and re-emit (scatter) it omni-directionally as point sources, such as cell nuclei, large proteins, etc. This interference pattern is indeed the source of the typical noisy texture of ultra-sound, called the speckle.

On the other hand, any macroscopic interface of impedance difference causes the US wave to be both reflected and refracted given its incidence angle. Accordingly, US may present both wave-like and ray-like properties, in a way similarly to light. Although the wave properties can be simulated in the entire domain, e.g. using finite difference methods, since the main ultrasound energy is focused in a certain direction, its wave-front can also be modeled as ray propagation in tissue.

A common model for simulating US interaction with sub-wavelength particles is to assume that tissue is populated with many (but countable number of) scatterers. These can then have varying scattering amplitudes, and act as spherical sources of scattering for incident ultrasound signal. Prior art performance-optimized have been developed by T. Varslot in Varslot T., Taraldaen G.: "Computer simulation of forward wave propagation in soft tissue", *IEEE Transactions on Ultrasonics, Ferroelectrics, and Frequency Control* 52, 9 (September 2005), 1473-1482 or in Varslot T., "Forward propagation of acoustic pressure pulses in 3d soft biological tissue", *Modeling, Identification and Control* (2006) and GPU-accelerated in Karamalis A. et al, "Fast ultrasound image simulation using the Westervelt equation", *Proceedings of MICCAI* (2010), pp. 243-250, but this wave simulations for ultrasound are still not fast enough to handle the complexity of clinical ultrasound in real-time. The computational complexity of such wave simulations restricts their use to offline simulation, as used in specific applications e.g., for transducer design and image processing algorithm development and validation. In the context of training simulators however these approaches are not applicable, as the generation of US images at interactive rates is essential and hence of high interest. A viable approximation of the full wave model is the convolution model for ultrasound speckle where the received intensity of the ultrasound is obtained by convolving scatterers with the point spread function (PSF) of the incident ultrasound energy at that location. Assuming a PSF separable in 3 axes and a discrete grid approximation, fast separable convolution of scatters was shown to simulate speckles interactively on modern GPUs (GAO H. et al. in "A fast convolution-based methodology to simulate 2-D/3-D cardiac ultrasound images", *IEEE Transactions on Ultrasonics, Ferroelectrics, and Frequency Control* 56, 2 (February 2009), 404-409 [GCC*09]).

However, scatterer-based methods do not inherently take into account reflection and distortion of the ultrasound beam at the interfaces between large-scale structures, the source of artifacts such as acoustic shadowing, ghosting, and multiple reflections. These are indeed important cues for differential diagnosis of pathology, and thus should be part of a realistic simulation. In ultrasound beamforming, incoherent (out-of-phase) ultrasound waves cancel out contributions of each other, creating a focused beam of ultrasound. The interaction of beamformed ultrasound with macroscopic structures like bones or organ surfaces can hence be well captured by ray-tracing techniques known from computer graphics. Prior art methods thus combine separable convolution for wave-like interference with fast surface-based ray-tracing and in particular make use of dedicated GPU-based rendering frameworks of mesh representations such as NVIDIA OptiX, as described for instance by Benny Bürger, Sascha Bettinghausen, Matthias Radle, and Jürgen Hesser, in "Real-time GPU-based ultrasound simulation using deformable mesh models", *IEEE Transactions on Medical Imaging*, 32(3):609-618, 2013 [BBRH13] and Salehi et al. "Patient-specific 3D ultrasound simulation based on convolutional ray-tracing and appearance optimization", *Proceedings of MICCAI* (2015), pp. 510-518 [SAP*15]. These prior art surface-based ray-tracing methods utilize a recursive ray-tracing scheme: whenever a ray terminates at a surface, a new refraction ray and a new reflection ray are cast according to Snell's law in a binary tree structure, until the contribution of a ray is smaller than a threshold. Such deterministic schemes make the assumption that large-scale structures behave like perfect mirrors with infinitely sharp reflections and refractions. This may be true for numerical phantoms and artificial tissue-mimicking material; however, in actual anatomy perfect reflections and refractions are never the case, hence these methods often produce artificial, toy-like images not comparable to actual patient ultrasound. For instance, the state-of-the-art methods [BBRH13, SAP*15] evaluate a diffuse reflection term only locally (similar to specular reflections in computer graphics) but do not take non-specular indirect contributions into account, hence suffering from "hard" shadows, sharp reflections, and too crisp structure borders—atypical in real US imaging. [SAP*15] further attempts to address these issues with a post-processing step to make images visually closer to expected; this, nevertheless, does not deal with the main problem of the wrong initial assumptions and can only partially improve the realism, while requiring additional post-processing at the expense of the overall computation efficiency and complexity.

We also observed that for reflections from rough (imperfect) surfaces, contributions from many directions have to be considered. In a framework of deterministic ray-tracing, it may be possible to cast multiple rays at each intersection point of the parent ray in order to integrate over their individual contributions. One major limitation of these deterministic ray-tracing approaches is that deeper recursion levels require summing over an exponentially-growing number of rays, although these contribute less and less to the final image. Therefore, these algorithms quickly become computationally inefficient. Furthermore, such method exhibits poor parallelism, since multiple rays on subsequent levels are dependent on the single parent rays. Introduced in the late seventies, this deterministic method has long been shown to be inferior to stochastic techniques for natural scenes, such as Monte-Carlo path tracing methods. Surprisingly, however, stochastic techniques have not been investigated in the literature for the purpose of ultrasound image simulation. Recently, Monte-Carlo techniques have been utilized for other uses of medical ultrasound, such as focused ultrasound therapy in Koskela J. et al., "Stochastic ray tracing for simulation of high intensity focal ultrasound therapy", *The Journal of the Acoustical Society of America* 136, 3 (2014), 1430-1440 [KVdG*14], where they have shown excellent performance and inherent parallelism. However, the purpose of the latter application is not to emulate the image formation process of ultrasound machines, and since therapy ultrasound frequencies cannot be used for image generation, these methods cannot directly be used to simulate radio-frequency or B-mode images. In particular the specific issues of generating realistic ultrasound images with the proper reflection and refraction for different anatomy component properties has not been investigated in the state of the art works for ultrasound simulation.

There is therefore a need for improved ray-tracing methods and systems to model and compute (diffuse) multiple reflections, which can be parallelized on a GPU architecture, to facilitate real-time, realistic, interactive ultrasound imaging simulation.

BRIEF SUMMARY

The object of the present description refers to a computer-implemented method for rendering, with a processor, a simulated ultrasound image, the method comprising:
Identifying, for an incoming ray hitting a geometric surface on a 3D anatomical model at a geometric intersection point $P_{T0}$, at least one variable surface parameter as a property of the underlying anatomy object tissue to characterize the surface as a partially diffuse surface;
Calculating multiple ray-tracing paths from multiple intersection points $P_T$ distributed as a function of the variable surface parameter, with a stochastic ray-tracing method;
Rendering the ultrasound image by combining one or more contributions from the calculated multiple ray tracing paths.

A ray tracer unit may be adapted to calculate multiple ray-tracing path reflections and refractions according to the proposed method embodiments. The ray tracer unit may be part of an ultrasound imaging simulation system, that is suitable for instance for medical ultrasound training applications.

Different possible embodiments will now be described with further detail in the forthcoming sections.

BRIEF DESCRIPTION OF THE DRAWINGS

FIG. 6 shows experimental measures comparing the computational efficiency of the proposed stochastic ray-tracing methods with prior art deterministic ray-tracing methods.

FIGS. 8a to 8d show the effect of the finite surface thickness parameter on the realism of simulated ultrasound images.

FIGS. 11a to 11e illustrates two specific cases of overlapping meshes and the results of a possible further embodiment to better address these specific cases by handling tissue priorities.

DETAILED DESCRIPTION

Ultrasound Imaging Simulation System

Figure 1:
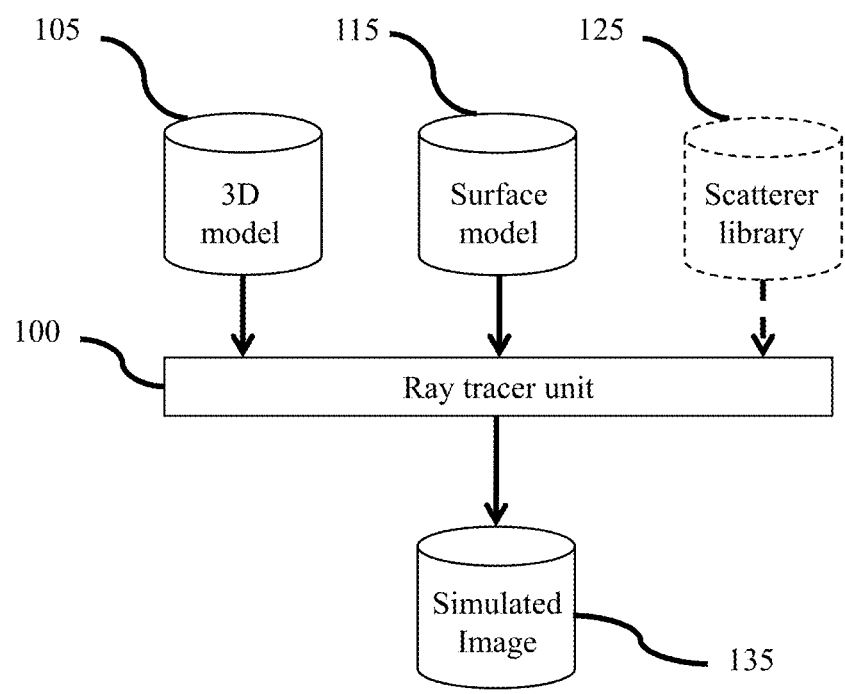
FIG. 1 represents a ray tracer unit in accordance with some embodiments of the present disclosure.

FIG. 1 represents an ultrasound imaging simulation system comprising a ray tracer unit 100 in connection with a 3D model 105 comprising a diversity of anatomy objects and the surface model parameters 115 characterizing different ultrasound tissue properties for the anatomy objects in the ultrasound volume model 105. The ray tracer unit 100 may comprise at least one central processing unit ("CPU") circuit, at least one memory, controlling modules, and communication modules to reconstruct simulated ultrasound images 135 corresponding to different views of the ultrasound volume model. In a possible embodiment, the ray tracer unit may be part of the rendering unit in an ultrasound simulation system (not represented) and the simulated ultrasound images may be displayed in real time on a screen of the ultrasound simulation system (not represented). Such an exemplary ultrasound system is for instance described in patent application WO 2017/064249, "Ultrasound simulation methods" filed on Oct. 14, 2016, but other embodiments are also possible, as will be apparent to those skilled in the art of medical training simulation. In another possible embodiment, the ray tracer unit may be part of the rendering unit in an offline ultrasound imaging system, which may be used to pre-compute sample ultrasound images for various scenarios and register them into a library of ultrasound images 135, which may then be later used by an interpolative ultrasound simulation system.

The ray tracer unit 100 may be adapted to process a diversity of anatomy object surface models 115, since different number of statistical parameterizations and operations may be needed depending on the diversity of the ultrasound simulation scenarios to be addressed.

In a possible embodiment, the ray tracer unit 100 may also be connected to a scatterer library 125 as may be prepared by a scatterer generator, such as the one described in the PCT patent application WO 2017/017051, "Method and apparatus for generating an ultrasound scatterer representation" filed on Jul. 25, 2016, but other embodiments are also possible.

Stochastic Surface Ray-Tracing Method

Figure 2A:
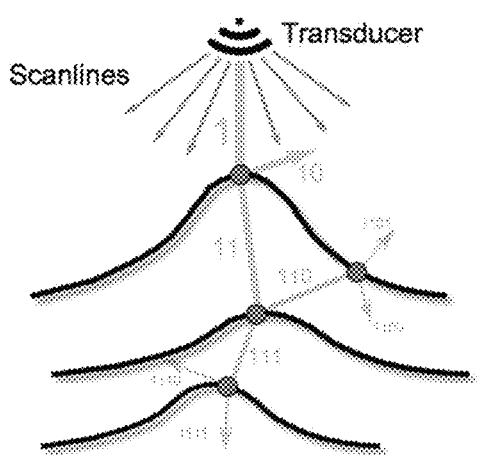
FIGS. 2a and 2b compare paths raytraced according to, respectively, a) deterministic and b) stochastic ray-tracing methods of the prior art.
Figure 2B:
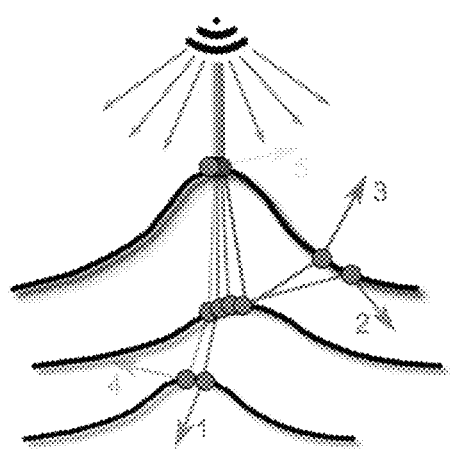

In a possible embodiment of the present disclosure, the proposed ray tracer unit 100 may employ an improved stochastic surface ray-tracing method by taking into account variable surface models 115 for simulating a beamformed ultrasound signal, by calculating stochasticly ray segments between tissue boundaries for each simulated incoming ray hitting a partially diffuse surface as a function of the properties 115 of the tissue layer under the surface. Examples of resulting ray segments produced from an incoming ray 1 are illustrated in FIG. 2a) as segments 11, 110, 111, 1110 and 1111, for the prior art deterministic methods of ray tracing. As will be apparent to those skilled in the art of computer graphics, for the prior art stochastic methods of ray tracing, many more unique segments may be generated for a similar geometry, as illustrated in FIG. 2b). Multiple ray paths have to be calculated, sampled (for instance with ray marching) and their contributions have to be combined to compute the overall intensity and render the final image.

The ultrasound 3D model 105 may be represented as a collection of 3D objects represented by a deformable triangular mesh as in [BBRH13] for instance, but different embodiments are also possible. In the context of ultrasound imaging simulation, each 3D anatomy object may have one or more different anatomy tissue properties, which results in a different behavior of the ray-tracing method. Each object in the 3D model 105 may be represented by a 3D mesh and each mesh surface may be associated with underlying ultrasound tissue properties as variable parameters 115, which can then be used by the ray-tracer unit 100 to more efficiently and realistically compute the individual ray segments contributions to generate the simulated ultrasound image 135.

As will be understood by one skilled in the art of computer graphics, the tissue properties may be associated globally with each 3D object and thus apply to all surfaces of the 3D object 105, or they may be associated separately with different voxels within the 3D object volume 105 for a finer granularity, depending on the specific properties of the object, e.g. a bone, a cyst, or a medical tool made of different materials may exhibit different global and local ultrasound echo properties. Note that throughout this disclosure, we employ the terminology "tissue" indifferently for various objects to be simulated, but this term may actually encompass different materials, not just organic soft or hard tissues.

In a conventional ultrasound imaging setup, the radiofrequency (RF') signal is created by recording ultrasound echo at several elements and then combining (beamforming) those into a single reading of ultrasound signal intensity I as a function of time t. Thus, I represents the tissue content along a beamformed RF line, often aligned in front of a transducer element. As known to those skilled in the art of ultrasound signal processing, in accordance with Snell's law, the ultrasound signals undergo distortions (e.g., reflections or refractions) proportional to their impedance ratios at the interfaces between two tissues, which coincide with a ray-surface intersection in a ray-tracing context. In a preferred embodiment of the present disclosure a new surface model 115 using variable parameters for each geometric surface hit by the incoming ray (ray-surface intersection) is proposed, such that the distortions are not deterministic but subject to random perturbations.

If echoes following different paths arrive at the transducers at the same time t, their partial contributions create an interference, adding up to the intensity received at that RF-line. Similarly, if the ultrasound signal disperses in several directions after a ray-surface intersection, their partial contribution from each adds up to the echo reading for that RF-line. In particular, when the US signal amplitude $I(t,O)$ received at the RF-line origin O after a surface intersection at point $P_T$ for time $t > T$ is to be computed, the partial contributions from all directions w of the surface hemisphere Ω centered at the surface normal may be integrated as (Eq. 1):

$$I_{t>T}(t,O) = \int_\Omega I(t,P_T,\omega)\cos(\omega)d\Omega$$

where $I(t,P_T,\omega)$ denotes the echo contribution from direction w originating from the ray-surface intersection point $P_T$. At a further intersection point $P_{T'}$, each ray path may split up again, i.e. (Eq. 2):

$$I_{t>T'}(t,P_T,\omega) = \int_{\Omega'} I(t,P_{T'},\omega)\cos(\omega')d\Omega'$$

Computing the echo interference at origin O at time t>T' requires the solution to a high-dimensional recursion of integrals of the form (Eq. 3):

$$I_{t>T}(t,O) = \int_\Omega \int_{\Omega'} I(t,P_{T'},\omega')\cos(\omega')d\Omega' \cos(\omega)d\Omega$$

the dimensionality of the integral being directly proportional to the number of surface intersections encountered. In practice, Eq. 1 can be discretized as (Eq. 4):

$$I_{t>T}(t,O) = \frac{1}{n}\sum_{i=1\ldots n} I(R_i(P_T,\omega_i))\cos(\omega_i)$$

where each individual contribution $I(R_i(P_T, \omega_i))$ is calculated by tracing rays $R_i$ from the surface intersection point $P_T$ in a finite number of n directions $\omega_i$, which may be drawn from a distribution over all possible hemispherical directions.

As will be apparent to those skilled in the art of computer graphics, deterministic algorithms of the prior art are not suited well for numerically solving such high-dimensional integrals, while also incurring exponential running time with regards to the number of recursions. Therefore, in a preferred embodiment, a stochastic algorithm such as those based on the Monte-Carlo statistical methods may be used to reduce the multi-dimensional integral into a tractable sampling problem. In the latter method, as illustrated by FIG. 2b) in comparison with the prior art deterministic binary ray-tracing method illustrated in FIG. 2a), the ray-tracer unit 100 may rather generate many random ray paths that are perturbed according to a probability distribution, until they converge to the correct solution. With this stochastic ray-tracing method, utilizing the parallelism of the GPU is then straight-forward to allow for a more efficient implementation of the ray-tracer unit 100, since each single ray path can be processed separately and in parallel. Accordingly, many more rays can be processed in parallel on the GPU, maximizing throughput and yielding better quality of the resulting ultrasound simulation images.

Surface Models

Figure 3A:
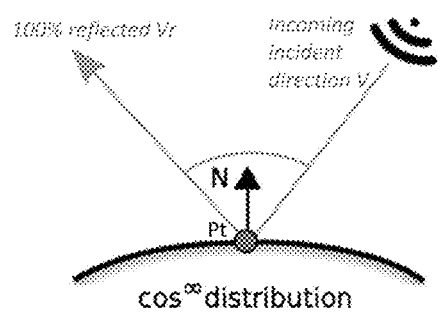
FIGS. 3a to 3d illustrate different surface model parameters in accordance with several embodiments of the present disclosure.

Previous work as illustrated in FIG. 3a) uses infinitely thin, specular, deterministic surface models. Each incoming incident ray along direction V interacts with the surface at a hit point $P_T$, resulting into one reflected ray along direction Vr and one refracted ray which continues its path through the surface along direction Vi. These models do not account for partially diffuse surfaces from which multiple reflected and multiple refracted rays may be cast. The prior art models thus result in a lack of realism for the resulting reconstructed ray-traced images in ultrasound simulation applications. There is therefore a need for better surface modeling methods.

Surface Thickness

First, we realized that the proposed stochastic ray-tracing method further allows to simulate varying surface "thicknesses", that is, a fuzzy transition area that the ray may penetrate around the tissue surface after hitting it. To this end, the simulated starting point $P_T$ of the reflected/refracted ray path may be distributed along the surface thickness as illustrated on FIG. 3b). In a possible embodiment, a Gaussian distribution may be used to model the variable surface thickness as the variation of the hit point $P_T$ position along the surface thickness, but other distributions may also be used. For an incoming ray with normalized direction $\vec{V}$ hitting the geometric surface (e.g., the mesh surface) with normalized direction $\vec{N}$ at position $P_{t_0}$, an offset τ from the geometric intersection point $P_{t_0}$ may then be computed as (Eq. 5):

$$\tau = q|\vec{V}\cdot\vec{N}|, \quad q \sim N(0,h)$$

wherein q is a normal distributed random variable and h is a tissue specific thickness parameter.

Figure 3B:
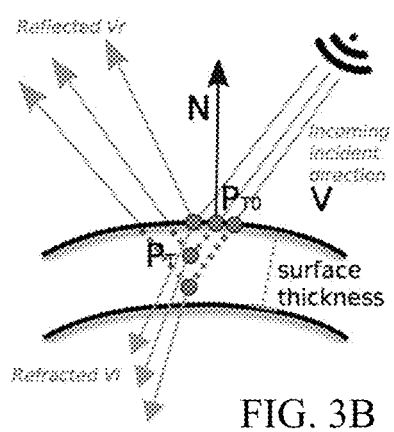

As illustrated on FIG. 3b), an incoming ray hitting the surface can produce different outgoing ray-paths starting from the resulting distributed intersection points (instead of a single predictable pair of reflected/refracted paths as in the prior art methods), as a function of the surface thickness parameter value characterizing the underlying tissue properties, for each object in the 3D anatomical model.

In a possible embodiment as illustrated on FIG. 3b), the offset T may be a positive offset so the intersection points are distributed below the geometric surface intersection point $P_{t_0}$, but other embodiments are also possible, for instance (not illustrated) the intersection points may be distributed both below and above the geometric surface intersection point $P_{t_0}$.

Surface Roughness

As another possible improvement over the prior art surface models, we have figured out that importance sampling may be applied for calculating the surface integral at an intersection point, depending on the actual surface roughness property. A perturbed normal may be sampled stochastically from a distribution of angles ranging from −180° to +180°. In practical scenarios, the perturbed normal is centered around the actual geometric surface normal $\vec{N}$. In a possible embodiment, as illustrated on FIG. 3c), a cosine-parameterized surface roughness model may be used, where the normal used for calculating the reflective/refractive rays is perturbed around the geometric surface normal, i.e., using a perturbed normal $\vec{N}'$ in the above equations. For calculating the surface integral at an intersection point, a uniform distribution of normals may be generated over the hemisphere and each generated ray contribution may be weighted according to a $\cos^3$ distribution. In this model, the surface roughness s parameter s=0 corresponds to a perfectly diffuse surface, while s=∞ corresponds to a perfectly specular surface, and any intermediate value of s characterizes a partially diffuse surface. In a further possible embodiment, to speed up convergence, importance sampling may be used, wherein the perturbed normals are generated according to the $\cos^3$ distribution and each individual ray has the same weight. As will be apparent to those skilled in the art, other distributions than the $\cos^3$ distribution may also be used, such as a triangle distribution or a Gaussian distribution.

Figure 3C:
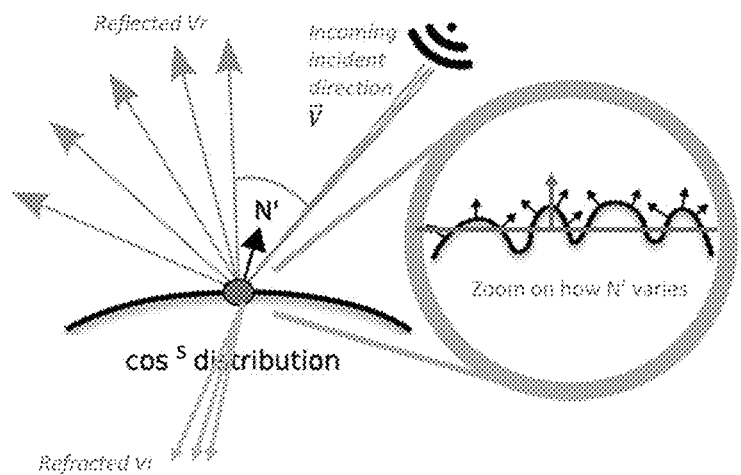

As illustrated on FIG. 3c), an incoming ray hitting the surface can take different paths based on resulting distributed intersection points (instead of a single predictable pair of reflected/refracted paths as in the prior art methods), as a function of the surface roughness parameter value characterizing the underlying tissue properties, for each object in the 3D anatomical model.

Ray Attenuation

In a further possible embodiment, each penetrating ray may be further attenuated according to an attenuation parameter α specific to the tissue properties. In a possible embodiment, the attenuated ultrasound intensity in tissue may be calculated as $Ie^{-|l|\alpha}$ using the Beer-Lambert law, for a distance l traveled in the tissue and a tissue-specific absorption coefficient α value. For example, bone has a very high attenuation parameter α, hence ultrasound can only penetrate a little amount before a sharp drop in intensity, causing the typical appearance of bone reflections in the ultrasound images.

Importance Sampling

Whether a reflective or refractive ray is to be generated at an intersection point may also be decided using importance sampling. The probability of generating a reflective (refractive) ray may be directly given by the computed reflective (refractive) intensities Jr (Ji), since both terms must add up to 1 due to conservation of energy. Using a random decision variable x, a reflective ray may be generated if x<Jr, while a refractive ray may be generated otherwise. This ensures that the ratio of the reflected versus refracted rays is proportional to the reflective (refractive) intensities, and hence the contribution of each individual ray to the overall ultrasound intensity for n rays may thus be simply weighted by a constant 1/n, i.e. each individual ray has the same weight. This approach differs prior art deterministic ray tracing methods, in which both a reflected and a refractive ray are computed and followed at each intersection. We observed in our experiments that importance sampling yields faster convergence of the computation of the rendering integral, while providing an excellent approximation of the ultrasound physics with only a handful of Monte-Carlo samples.

Beam Coherence

Figure 3D:
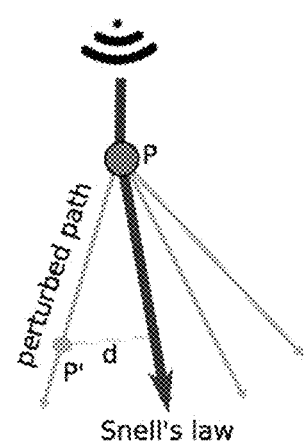

The cancellation of out-of-phase ultrasound reflections due to beamforming is an important ultrasound property, which has the effect that incoherent ultrasound beams lead to destructive interference diminishing the echo intensity. To simulate this effect, in a possible further embodiment a weighting factor may be used for the contribution at every point along a perturbed ray path R in Eq. 4. Different weighting functions may be used. In a possible embodiment, we attenuate the path contribution with a factor $w_R$ proportional to the distance from a hypothetical ray d) (which is not actually cast) representing the center beam direction, i.e., the direction $\vec{V}$ given by Snell's law (FIG. 3d). In a possible embodiment, $W_R$ may then be computed as (Eq. 6):

$$w_R = \frac{C_1}{C_1 + d(P', \vec{V})}$$

wherein P is the origin of R and P' any point along R, whereas $C_1$ is a user-defined global constant that may be chosen in the range [0.01 . . . 0.1], and d is the point ray-distance (Eq. 7):

$$d(P', \vec{V}) = |P - P' - ((P - P') \cdot \vec{V}) \vec{V}|$$

Incident US Energy

At each tissue intersection $P_T$, the US echo $J_{local}$ reflected back to the transducer may then be computed using a local illumination model similar to Phong shading as known to those skilled in the art of computer graphics (Eq. 8):

$$J_{local} = \max(\cos^s(\angle(\vec{V}_r, \vec{D})), 0) + \max(\cos^s(\angle(\vec{V}_i, \vec{D})), 0)$$

where $\vec{V}_r$ is the reflected ray direction and $\vec{V}_i$ is the refracted ray direction, $\vec{D} = P - O$ for transducer origin O, and s models the specularity of a surface. According to this roughness parameterization of the surface, the reflected rays follow a distribution as illustrated in FIG. 3c). We observed in our experiments that the addition of the refractive term, compared to previous work methods such as the one disclosed in [BBRH13], brings substantial improvement to the tissue model. In practice, both terms are important in the model, as we observed that usually only one of them has a non-zero contribution.

Simulation of Microscopic Speckle and Tissue Properties

Compared to the prior art somewhat naïve surface modeling methods, the proposed surface model taking into account the surface thickness and/or the surface roughness and/or possible path weighting enables to better simulate the directional reflections of the ultrasound signal at large-scale surface interfaces. Typical ultrasound speckle texture is produced by interactions of traveling ultrasound wave with sub-wavelength particles in the tissue, which scatter the incident ultrasonic power. In ultrasound simulation, the observed reflected ultrasound wave (RF signal) can be approximated by convolving scatterers in the tissue with a (scattering) point-spread function (PSF). In a ray-tracing framework, the scatterers may be represented as 3D textures characterizing the tissue, so that they may be retrieved by the ray tracer unit 100 by sampling of a ray (ray-marching) at certain intervals. In a further possible embodiment, the ray tracer unit 100 may be further improved by modeling additional contribution factors to the scattered intensity due to the tiny scatterers in the tissue, as represented by the library of scatterer models 125 in FIG. 1. Scatterers may be used all along the ray path during the sampling of the segments, that is along the surface "thickness" area as well as beyond.

Convolution Model

In prior-art convolution models of ultrasound speckle, the scattered intensity r(l,a,e) is obtained by convolving a function representing the tissue property g(l,a,e) with an ultrasound PSF h(l, a, e) given additive random noise e, i.e. (Eq. 9)

$$r(l,a,e) = g(l,a,e) * h(l,a,e) + \varepsilon$$

where l denotes the lateral, a the axial, and e the elevational transducer axes. As described in the PCT patent application WO2017017051, "Method and apparatus for generating an ultrasound scatterer representation", h(l,a,e) may be approximated by a Gaussian envelope modulated at an acquisition center-frequency off, (typically between 2 to 14 Mhz for clinical use). It is then in the form of (Eq. 10):

$$h(l, a, e) = e^{-\frac{l^2}{2\sigma_l^2} - \frac{a^2}{2\sigma_a^2} - \frac{e^2}{2\sigma_e^2}} \cos(2\pi f_c a)$$

which is a function, separable into lateral, axial, and elevational components. This greatly accelerates the convolution computation, by enabling the parallel computation of separate 1D convolutions instead of a single 3D one.

Scatterer Parameterization

In a possible embodiment, the scatterer unit may use the efficient parametric scatterer model of [BBRH13] with the scatterer modeling and possibly the PSF automated estimation methods of the PCT patent application WO 2017/017051, but other embodiments are also possible, for instance the PSF may be set manually or measured experimentally by imaging sub-wavelength synthetic features, e.g., wires, in degassed water. For each tissue type, this parametric scatterer model has 3 values to characterize a random distribution of scatterers, which are responsible for a particular speckle appearance after convolution: the pair ($\mu_s$, $\sigma_s$) describes the normal distribution of scatterer amplitudes, while $\rho$ is the so-called scatterer density, that gives the probability threshold above which a scatterer will provide an image contribution (i.e., the convolution will be performed for that scatterer). Each tissue is characterized by these three values, using which a scatterer value may be generated from a random texture variable at each point.

As will be apparent to those skilled in the art of computer graphics, all segments between intersection points of the calculated ray-tracing paths may then be retrieved from the 3D anatomical model and sampled along by using the scaled sampling coordinates as lookup indices into the 3D scatterer texture (s). In a possible embodiment, to apply this method with a low memory footprint and high runtime performance, we follow the approach of [BBRH13], where a random Gaussian variable is stored in association with a 3D scatterer texture and used for lookup during the ray marching. For $\xi(x,y,z) > \rho_s$, the scatterer value may be defined as $\delta(x,y,z) = \mu_s + \xi(x,y,z)\sigma_s$, whereas $\delta(x,y,z)=0$ otherwise. To reduce memory requirement while keeping the scatterer resolution high, the 3D scatterer texture may only cover a small part of the ultrasound volume and be replicated for the rest, for instance it may be set to an easily manageable size, e.g., of $256^3$. Other embodiments are also possible, for instance the scatterer models may be automatically generated using the methods described in the PCT patent application WO 2017/017051.

Multi-Scale Scatterer Parameterization

In order to represent a smooth small-to-large scale speckle variation, the parametric scatterer model may also be extended with a coarser component using one or more additional Gaussian variable stored in lower resolution 3D textures. In our experiments, this resolution was empirically chosen as $20^3$. Accordingly, two new parameters may be added to the tissue model; the magnitude $\hat{\mu}_s$ and the variance $\hat{\sigma}_s$ of low-frequency changes in the tissue. The variance Os acts as a scale factor for the look-up into the noise and the magnitude $\hat{\mu}_s$ controls the influence of random variation on the scatterer values, i.e. the final multi-scale scatterer value is computed as (Eq. 11):

$$(x,y,z)=\delta(x,y,z)(1+\hat{\mu}_s \hat{\xi}(x\hat{\sigma}_s, y\hat{\sigma}_s, z\hat{\delta}_s))$$

where x,y,z is the current position in the ultrasound volume. As will be understood by those skilled in the art, such lower resolutions variations may enable to encode small anatomical details that may not be modelled in lower resolution tissue geometries. Such a multi-scale scatterer representation may also be used with different scatterer modelling methods.

Interleaved Volumetric Model

Figure 4A:
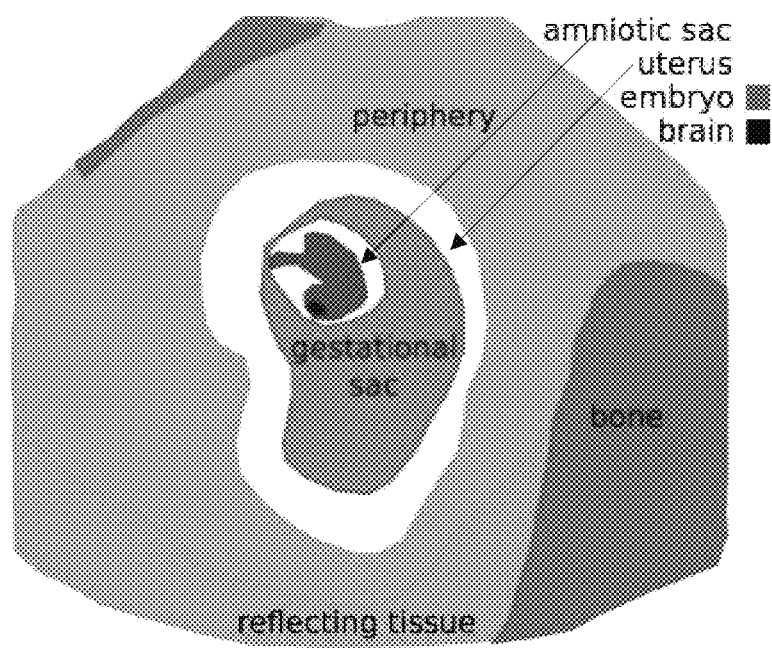
FIGS. 4a and 4b illustrate a possible layered model in the exemplary application of an in-vivo pregnancy ultrasound simulation.
Figure 4B:
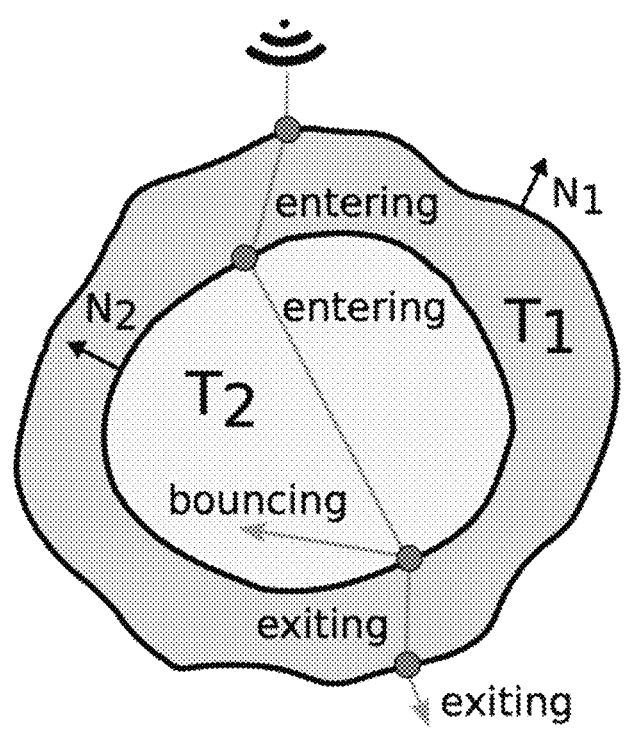
Figure 5A:
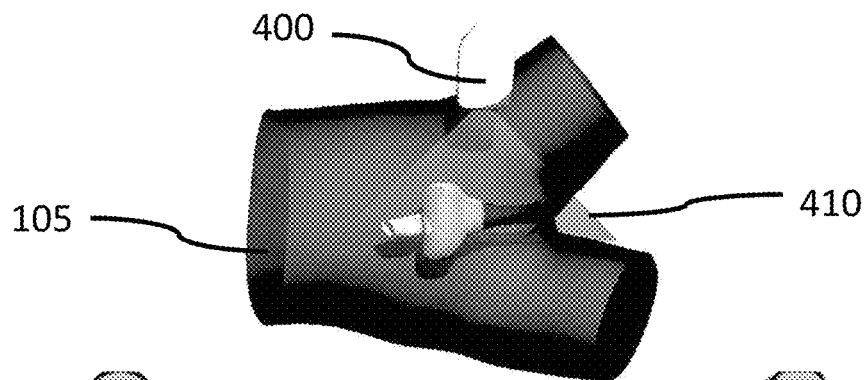
FIGS. 5a to 5d show a possible layered ultrasound B-mode image acquisition scheme according to possible further embodiments of the present disclosure.
Figure 5B:
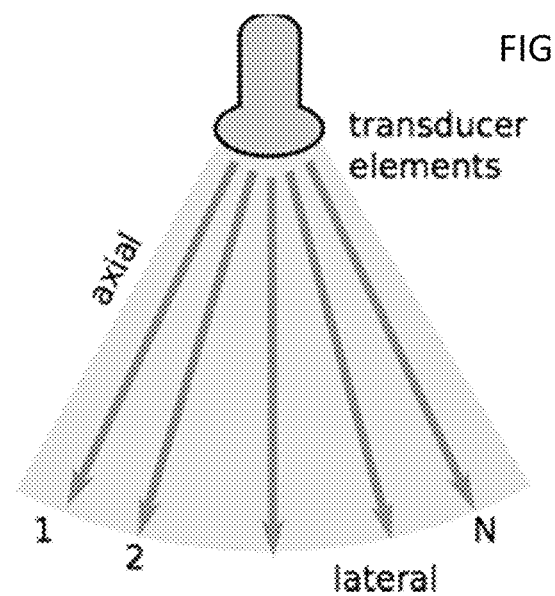
Figure 5C:
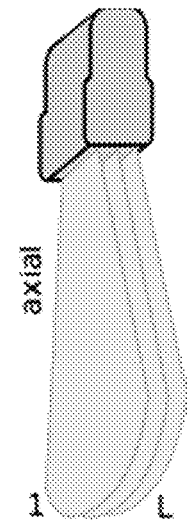
Figure 5D:
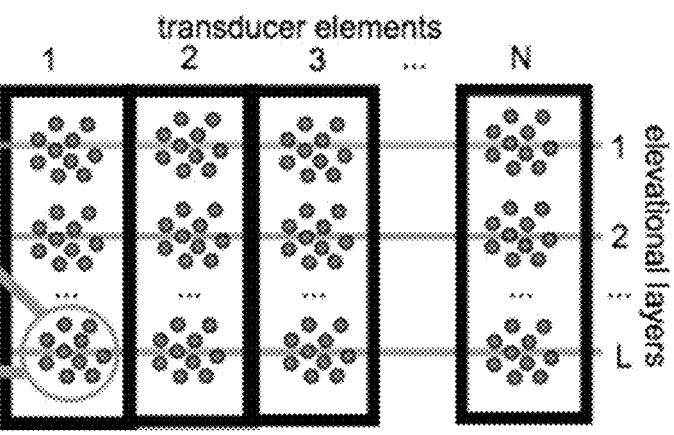

In medical ultrasound simulation applications, anatomical scenes consist of several tissue layers that participate in complex ray interactions. An approximate segmentation of tissue layers in the US plane is depicted for instance in FIG. 4a). This particular scene consists of seven interleaved layers: uterus, placenta, gestational sac, amniotic sac, embryo body, skeleton, brain and inner organs. Whenever the current ray intersects a surface, one has to keep track of the tissue model characteristics and possibly the scatterer parameterization that is used in the next segment, from the current intersection point until the ray hits another surface boundary. As will be apparent to those skilled in the art of ray tracing, a possible embodiment for the bookkeeping of current tissue properties may use classical methods for ray-tracing such as Constructive Solid Geometry (CSG). In order to find the tissue type within which a particular ray segment is travelling (and thus the corresponding parameters for ultrasound speckle simulation), we propose a stack-based system, where the stack represents the tissue properties of previously traversed surface layers. In a possible embodiment, this ray tracing unit stack-based system may operate based on three simple rules, as illustrated in FIG. 4b), but other embodiments are also possible:

Entering

The current ray is a refracting ray, and the ray is entering the current object. In this case, the surface normal is facing into the opposite direction as the ray; e.g., normal $N_2$ as the ray hits the boundary from $T_1$ to $T_2$ with reference to FIG. 4b). The properties of tissue $T_1$ are pushed on the stack.

Exiting

The current ray is a refracting ray, and the ray is exiting the current object. In this case, the surface normal is facing into the same direction as the ray; e.g., normal $N_2$ as the ray hits the boundary from $T_2$ to $T_1$ with reference to FIG. 4b). The properties of tissue $T_1$ are popped from the stack.

Bouncing

If the current ray is a reflecting ray, it simply bounces off from a tissue surface, so the current tissue region and hence its properties stay unchanged.

To avoid tissue classification errors due to numerical errors, a constant surface offset $\delta=10^{-4}$ may be used, as is common in conventional ray-tracing applications to avoid light leaking or shadow artifacts, but other embodiments are also possible. Furthermore, the interleaved surface meshes may be constrained to: not contain holes, have a consistent normal orientation, and not intersect or touch each other. Finally, we note that, as will be apparent to those skilled in the art, the proposed layered model may indifferently apply to deterministic or Monte-Carlo ray-tracing simulations.

Application to Ultrasound Image Generation

A practical illustration of a 2D ultrasound simulation scheme is depicted in FIG. 5. An ultrasound transducer 400 is positioned relative to a 3D anatomy model 105. The ultrasound signal is acquired in the so-called transducer plane 410 (FIG. 5a). A ray is started from each of the K transducer elements and continuously travels within a tissue yielding the echo signal along that scanline (FIG. 5b). To account for finite transducer thickness which may lead to a non-negligible out-of-plane effect, rays may be instantiated at several acquisition layers along the elevational (out-of-plane) axis of the transducer, as depicted in FIG. 5c), a strategy which was also used in previous work [BBRH13, SAP15]. To initialize our Monte-Carlo ray-tracing scheme, K ray paths are originated around the center point of each scanline/elevation layer following a normal distribution, as shown in FIG. 5d). Their intensity contributions for the transducer element are accumulated according to Eq. 4. This stratified sampling scheme also avoids aliasing effects due to regular sampling of an elevation layer.

To find the speckle contributions along all participating rays and to form an ultrasound B-mode image, we use the following steps. First, our surface ray-tracing model is used to find the ray path segments between tissue boundaries, corresponding to the current tissue being traveled in. Then we march stepwise along the ray segment, averaging the scatterer contributions of our improved tissue model in a small volume around each sample point. The result is stored in a 3D grid g(l,a,e), consisting of N lateral scanlines, M axial sample points, and L elevation layers. Each axial sample point in g(l,a,e) corresponds to the distance traveled at time $t_{i=1...M}$ along the ray segment. The time step is given by the desired RF sampling frequency to simulate, which is typically around 20 to 100 MHz, and the distance traveled per time step is given by the speed of sound in the current tissue. The regular structure of g(l,a,e) enables us to run fast separable PSF convolution with PSF h(l, a, e) in parallel, using Eq. 9. The result is r(l, a), the simulated beamformed US radio-frequency (RF) image in the transducer plane. Emulating typical clinical imaging systems, we then input this RF image to a post-processing pipeline (envelope computation, time-gain compensation, log compression, and scan-conversion into Cartesian coordinates, if a convex transducer is being simulated), which yields the final grayscale B-mode image displayed on US machines.

Experimental Results

Our method was developed in C++, using NVIDIA OptiX as framework for the mesh-based ray-tracing, and NVIDIA CUDA v7.0 for the ultrasound post-processing (image formation) pipeline. An NVIDIA GTX 780Ti GPU with 3 GB was used for all experiments. Detailed statistics of various simulated scenes and timing comparisons are shown as Table 1 and Table 2 in FIG. 6.

The timings in Table 1 in FIG. 6 were recorded for a maximum of 12 recursion levels for both deterministic ray-tracing and Monte-Carlo ray-tracing (MC). The number of rays per transducer element/elevation levels for Monte-Carlo ray-tracing varies from 5 to 40. For 5 elevation levels per elements, this means 25-200 rays cast per element, resulting in a total of 480-38400 ray paths for 192 scanlines per frame. Note that the throughput of rays/second increases for a higher number of generated rays, exhibiting an increased level of parallelism. The slower render times of the embryo model compared to the heart model, despite the former having less triangles, can be attributed to the particularly complex in-plane and out-of-plane ultrasound interactions.

Table 2 in FIG. 6 describes the relation between the number of recursion levels and the render times. Binary ray-tracing is greatly affected by this factor, which is unsurprising due to the exponential dependence of the algorithm complexity on the number of recursions. On the other hand, Monte-Carlo ray-tracing remains almost unaffected.

Figure 7A:
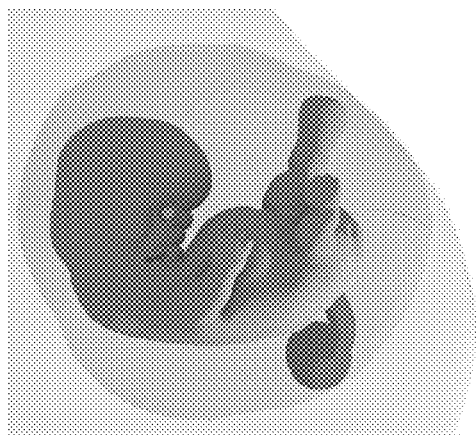
FIGS. 7a to 7d show an embryo model a), a deterministic ray-tracing simulated image according to the prior art b), a Monte-Carlo ray-tracing simulated image according to a proposed method c), and a comparable actual in-vivo ultrasound image d) for subjective evaluation of the simulated ultrasound image realism.
Figure 7B:
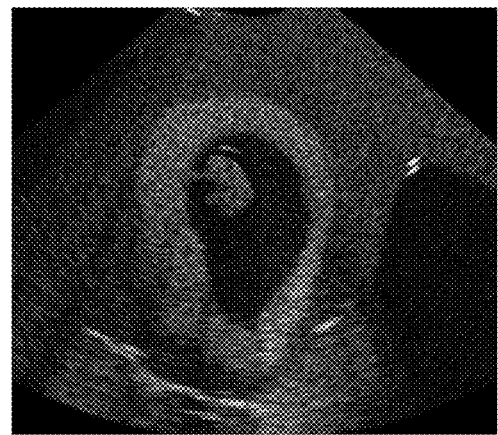
Figure 7C:
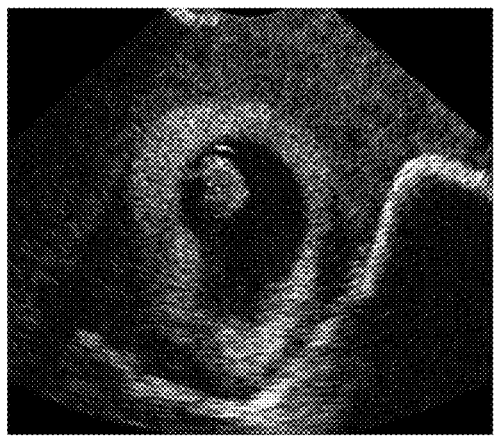
Figure 7D:
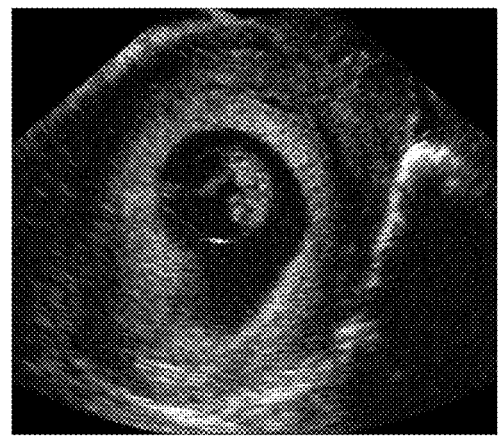

FIG. 7 shows a comparison of deterministic binary ray-tracing (FIG. 7b) with the proposed Monte-Carlo method (FIG. 7c) for ultrasound (US) simulation of pregnancy with a surface-based embryo model 105 of 255 K triangles (FIG. 7a). The embryo was designed as an anatomically correct 3D surface model, whereas the gestational sac, uterus, and nearby bones were annotated from the scanned 3D image volume and exported as surface meshes. The actual in-vivo ultrasound image shown in FIG. 7d is a single slice of this fan-shaped scan volume, with a total of 215 slices spanning 120 degrees in out-of-plane direction. The embryo model has detailed anatomy such as the brain, stomach, eyes, and a skeleton. This turns out to be necessary to simulate the visually rich content of the actual embryo, which is, as expected, at the focus of attention for a trainee during pregnancy examination.

We asked an expert sonographer to rate the images in FIG. 7 from 1 to 7 in terms of realism (7 is very realistic), and in terms of perceived similarity to the in-vivo image (ignoring the different age of the embryo). The expert rated deterministic ray-tracing as 2 on both accounts, and rated the image generated with our method as 6.5 on both accounts, thus confirming the high realism and clinical feasibility of our presented image simulation approach. The expert stated that both pregnancy and surroundings are not very realistic for FIG. 7b, while in FIG. 7c) the pregnancy is very realistic and the surroundings close to realism. This indicates that our Monte-Carlo ray-tracing method can reproduce the physics of ultrasound imaging more realistically than prior art work.

FIG. 8 and FIG. 9 demonstrate the effect of our surface model with finite thickness and roughness surface models respectively. In FIG. 8a), ignoring the thickness parameter results in a flat and unrealistic bone appearance. Increasing the finite thickness parameter influences the appearance of the bone, which becomes more plastic and organic for larger thickness values (FIGS. 8b-d). The realistic attenuation of the thick bone segment is achieved because our model takes into account the correct attenuation with respect to the penetration distance that a ray travel inside of the bone.

Figure 9A:
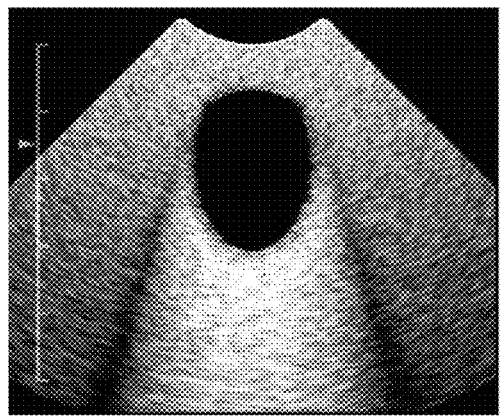
FIGS. 9a to 9d show the effect of the surface roughness distribution model on a spherical object and on the brightness of a hyperechoic posterior region.
Figure 9B:
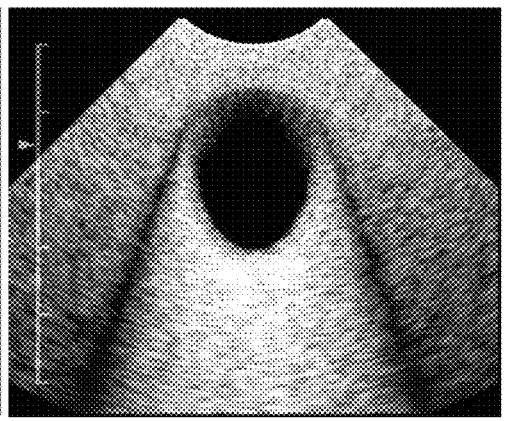
Figure 9C:
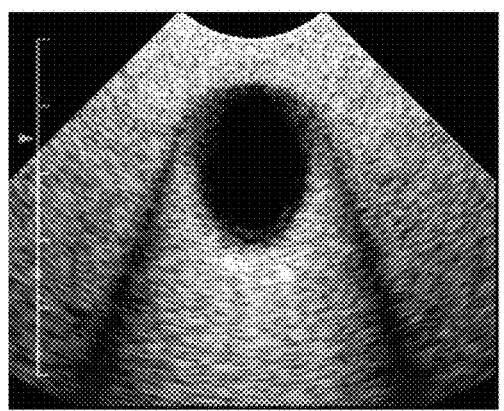
Figure 9D:
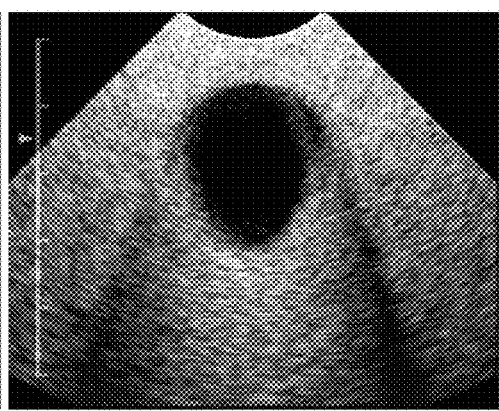

FIGS. 9a) and 9b) correspond to perfectly specular surfaces, with the difference that FIG. 9a) corresponds to prior art deterministic ray-tracing where perfectly specular surfaces are the default (no surface model), while FIG. 9b) uses the other extensions of the proposed Monte-Carlo ray-tracing method like finite thickness surface modeling, but still no roughness. For images FIG. 9c) and FIG. 9d), the surface of the scanned object is set to become increasingly rougher. This results in softer refraction shadows and fuzzier object boundaries. For simulating a particular tissue, the proper value of surface roughness may be set according to a dedicated experiment or empirically by manual trial-and-error.

Figure 10A:
FIGS. 10a and 10b show the influence of large-scale speckle variation on the simulated ultrasound image for a pregnancy scene according to a further embodiment of the proposed Monte-Carlo ray-tracing method.
Figure 10B:

In FIG. 10), we demonstrate the influence of the improved embodiment with a scatterer parameterization model by comparing the image simulation without speckle variation FIG. 10a) and the image simulation with speckle variation FIG. 10b) for a pregnancy scene. The large-scale variation gives the illusion of complexity in parts of the image where actual geometric detail is missing. The increased visual complexity can best be observed in the upper right part of the image, in the absence of any real geometry. Furthermore, it gives a more detailed appearance to parts of the image where geometry exists but is not sufficiently detailed. This can be seen, for example, when comparing the appearances of the uterus (the bright band in the center of the image) in both images. While speckle variations cannot fully replace the complexity of actual geometry, it nevertheless greatly simplifies the task of a modeler in the face of the overwhelming complexity of an actual patient's interior.

Other Embodiments and Applications

Robust Volumetric Tissue Model

In the model described so far, the underlying assumption on surface meshes to be non-overlapping requires careful modelling, to avoid classification errors of the currently used tissue. Furthermore, as will be apparent to those skilled in the art of computer graphics, not allowing intersecting meshes is a rather strong constraint on the type of scenes that can be modelled in practical applications. For instance, in medical applications different anatomy 3D models 105 with different ultrasound tissue properties may be arranged hierarchically, e.g. the soft tissue brain of an embryo within the hard tissue skull of the embryo. In a further embodiment, different object meshes may be assigned a priority to improve the robustness of stack-based volumetric rendering. This mechanism may automatically correct unclear cases in the classification of tissue that can occur due to surface intersections of two meshes from consecutive hierarchy levels. In a possible embodiment, a priority number may be stored in association with the parameters 115 for each tissue, representing the hierarchy level of the corresponding object in the scene, i.e., the number of surface layers an object is embedded in. For example, in pregnancy ultrasound simulation, the embryo brain may be associated a higher priority than the skeleton since it resides inside the skull. A non-corrupted stack can be identified by checking that the priorities are weakly ordered and ascending, and ≤the priority of the currently rendered tissue. Error cases are avoided by checking if priority i of the current tissue is higher than priority j of the tissue assigned to the intersected surface mesh, based on the simple rule to always prefer higher priority tissue when in doubt. As will be apparent to those skilled in the art of computer programming, other embodiments are also possible, for instance descending order may be used rather than ascending.

In a case where a ray enters an intersected surface (FIG. 11b and FIG. 11d), the currently rendered tissue may be pushed onto the stack and the tissue assigned to the intersected surface mesh may be set as the next tissue to be rendered. However, if we find that priorities $p_j < p_i$, we may swap the role of the tissues and render the higher priority tissue $T_i$ first (thus maintaining a correct stack).

In a case where a ray exits an intersected surface (FIG. 11c and FIG. 11e), the current tissue may be replaced with the top of the stack and the stack is popped. Again, we check if priorities $p_j < p_i$, in which case it can be easily verified that the assumption of non-intersecting surfaces has been violated and the next tissue is not on the stack. Instead, the current (higher priority) tissue $T_i$ may be used for rendering the next segment.

Computational Optimization—Adaptive Sampling Using Scout Rays

In the areas where not so much geometry is present, or cases where rays don't get deviated much from the original path, fewer rays per element may be needed to converge to a plausible visual appearance. Hence, by using a constant number of rays per element, many rays are shot unnecessarily. Instead, for each rendered frame we first shoot so-called scout rays to probe the geometry and find an optimal number of ray paths $n_{opt}$ per scanline/layer to achieve convergence, before starting the actual ultrasound simulation using the specified ray number.

A single scout ray is first shot per scanline/layer position element, which recursively penetrates one surface intersection at a time. For each penetrated surface, the number of ray samples $n_i$ required to simulate this surface intersection may be computed as a function of factors influencing convergence, for instance how much the ray paths intersecting this surface will deviate from the straight trajectory, as well as the surface thickness. In a possible embodiment, a combination of 5 individual terms may be used (Eq. 12), but other embodiments are also possible:

$$n_i = C_6 \min\left(1, \max\left(10 C_2 h, C_3^s C_4 \left|1 - \frac{Z_1}{Z_2}\right|, C_5\right)\right)$$

wherein:
h represents the thickness parameter of tissue Ti.
s characterizes the shininess of tissue Ti, modelling the expected deviation from the deterministic ray path defined by Snell's Law. This factor is multiplied with a term proportional to the expected reflection strength, where Z1 and Z2 respectively characterize the impedance of tissue Ti and Ti−1.

$C_2$, $C_3$, $C_4$ and $C_5$ are user defined weighting factors for the individual terms which may be chosen in the [0 . . . 1] range. The result in [0 . . . 1] is then multiplied by a number $C_6$ representing the maximum number of samples that can be added for each subsequent surface intersection. In our application, we fixed these values empirically to C2=0.45, C3=0.95, C4=0.10, C5=0.03, C6=20, but other values are also possible.

The overall number of ray paths $n_{opt}$ required for an element/layer may then be computed as (Eq. 13):

$$n_{opt} = \left\lceil \sum_i n_i \right\rceil$$

Although the detailed description above contains many specificities, these should not be construed as limiting the scope of the embodiments but as merely providing illustrations of some of several embodiments.

In particular, as alternative to the Monte-Carlo ray-tracing technique, different stochastic ray-tracing techniques may be employed by the ray-tracer unit 100, for instance Metropolis sampling or bi-directional path tracing, as will be apparent to those skilled in the art of computer graphics ray-tracing.

The proposed embodiments have been shown experimentally to generate plausible ultrasound images from a good surface model and suitable tissue parameterization as can be easily setup on a case-per-case application basis, for instance here a pregnancy simulation. However, creating sufficiently complex surface models and finding these tissue parameters may imply tedious manual tasks that take considerable time and substantial fine-tuning for other applications. To generalize the proposed embodiments to more diverse surface and tissue properties, image-based techniques may be further applied for automatically parameterizing individual tissues or for automatically improving similarity to a target image in a post-processing stage.

While various embodiments have been described above, it should be understood that they have been presented by way of example and not limitation. It will be apparent to persons skilled in the relevant arks) that various changes in form and detail can be made therein without departing from the spirit and scope. In fact, after reading the above description, it will be apparent to one skilled in the relevant art(s) how to implement alternative embodiments.

As will be apparent to those skilled in the art of digital data communications, the methods described herein may be indifferently applied to various data structures such as data files or data streams. The terms "data", "data structures", "data fields", "file", or "stream" may thus be used indifferently throughout this specification.

Although the detailed description above contains many specific details, these should not be construed as limiting the scope of the embodiments but as merely providing illustrations of some of several embodiments.

In addition, it should be understood that any figures which highlight the functionality and advantages are presented for example purposes only. The disclosed methods are sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware unit may be implemented mechanically, electronically, or any suitable combination thereof. For example, a hardware unit may include dedicated circuitry or logic that is permanently configured to perform certain operations. For example, a hardware unit may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities.

Although an overview of the inventive subject matter has been described with reference to specific example embodiments, various modifications and changes may be made to these embodiments without departing from the broader spirit and scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A computer-implemented method for rendering, with a processor, a simulated ultrasound image, the method comprising:
    identifying, for an incoming ray hitting a geometric surface on a 3D anatomical model at a geometric intersection point $P_{T0}$, at least one variable surface thickness parameter and/or one variable roughness parameter as properties of an underlying anatomy object tissue to characterize the surface as a partially diffuse surface;
    calculating multiple ray-tracing paths from multiple intersection points $P_T$ distributed as a function of the variable surface thickness parameter and/or the variable surface roughness parameter, with a stochastic ray-tracing method;

rendering the ultrasound image by combining one or more contributions from the calculated multiple ray-tracing paths, each calculated ray-tracing path being further attenuated as a function of an attenuation parameter $\alpha$ characterizing the underlying anatomy object tissue and of a penetrated distance l in the tissue.

2. The method of claim 1, wherein the multiple ray-tracing paths are calculated using a Monte-Carlo ray-tracing algorithm, a Metropolis sampling algorithm, or a bi-directional path tracing algorithm.

3. The method of claim 1, wherein multiple intersection points are distributed using a Gaussian model as a function of the variable surface thickness parameter.

4. The method of claim 1, wherein an incoming ray with normalized direction $\vec{V}$ hits the geometric surface with normalized direction $\vec{N}$ and the multiple intersection points are distributed along a variable surface thickness depth $\tau$ relative to the geometric intersection point $P_{T0}$ being computed from a normal distributed variable q and a tissue-specific variable surface thickness parameter h, as:

$$\tau = q|\vec{V}\cdot\vec{N}|, \quad q \sim N(0,h).$$

5. The method of claim 1, wherein the incoming ray hits the geometric surface at the geometric intersection point $P_{T0}$ with normalized direction $\vec{N}$, and a perturbed normal around $\vec{N}$ is sampled stochastically from a distribution of angles ranging from $-180°$ to $+180°$, the variable surface roughness parameter controlling the distribution of angles centered around the actual geometric surface normal $\vec{N}$.

6. The method of claim 5, wherein a cosine-parameterized surface roughness model is used to distribute the perturbed rays according to a $\cos^s$ distribution, where the surface roughness parameter $s=0$ corresponds to a completely diffuse surface, while $s=\infty$ corresponds to a perfectly specular surface, and wherein a finite value of $s>0$ characterizes a partially diffuse surface.

7. The method of claim 1, wherein rendering comprises sampling along segments, each segment being defined between two intersection points of the calculated ray-tracing paths, with a ray-tracing algorithm, and averaging a contribution of each sampled individual ray out of n rays by weighting each sampled individual ray intensity by a constant 1/n.

8. The method of claim 1, wherein rendering comprises sampling along segments, each segment being defined between two intersection points of the calculated ray-tracing paths, with a ray-tracing algorithm, and for each calculated ray-tracing path, weighting a contribution of each ray-tracing path as a function of a distance from said ray path to a ray path corresponding to the main beam direction.

9. The method of claim 8, wherein the contribution of each ray-tracing path is further attenuated with a factor $w_R$ proportional to the distance of the ray-tracing path to a hypothetical ray representing a center ultrasound beam ray direction.

10. The method of claim 9, wherein $$w_R = \frac{C_1}{C_1 + d(P', \vec{V})}$$

and $$d(P', \vec{V}) = \left| P - P' - ((P - P') \cdot \vec{V})\vec{V} \right|$$

in which P is the origin of the ray, P' is any point along the ray path, $\vec{V}$ is the direction given by Snell's law, $C_1$ is a constant chosen in the range [0.01 . . . 0.1].

11. The method of claim 1, wherein rendering comprises calculating the ultrasound echo $J_{local}$ reflected back to the transducer using a local illumination model as:

$$J_{local} = \max(\cos^s(\angle(\vec{V}_r, \vec{D})), 0) + \max(\cos^s(\angle(\vec{V}_i, \vec{D})), 0)$$

where $\vec{V}_r$ is a reflected ray direction and $\vec{V}_i$ is a refracted ray direction, $\vec{D} = P - O$ for transducer origin O and the ray origin P, and s is a surface roughness parameter.

12. The method of claim 1, wherein rendering comprises sampling along segments, each segment being defined between two intersection points of the calculated ray-tracing paths, with a ray-tracing algorithm, by using the sampling coordinates as lookup indices into a 3D scatterer texture model characterizing the underlying anatomy object tissue to approximate a received ultrasound intensity and convolving the approximated ultrasound intensity with an ultrasound point-spread function (PSF) to simulate a reflected ultrasound wave RF signal.

13. The method of claim 12, wherein the 3D scatterer texture model is a multi-scale parametric model, the sampling coordinates scale factor for the look-up into the 3D scatterer texture model being controlled by a further tissue model variance parameter $\sigma_s$ and the influence of random variation on the scatterer values being controlled by a further magnitude parameter $\hat{\mu}_s$, the final multi-scale scatterer value being computed as a function of a further Gaussian variable e stored in a lower resolution 3D texture model:

$$\delta(x,y,z) = \delta(x,y,z)(1 + \hat{\mu}_s \hat{\xi}(x\hat{\sigma}_s, y\hat{\sigma}_s, z\hat{\sigma}_s))$$

where x,y,z is the current position in the 3D ultrasound volume.

14. The method of claim 1, further comprising extracting from a stack-based system the properties of the underlying anatomy object tissue a particular ray segment will be traveling, the stack-based operating with the following rules: entering or exiting the stack for refracting rays, and bouncing with no change in the stack for reflecting rays.

15. The method of claim 14, further comprising extracting from the stack-based system the properties of the underlying anatomy object tissue a particular ray segment will be traveling as a function of a priority number for each tissue, representing the hierarchy level of the corresponding object in the 3D anatomical model.

16. A ray tracer unit, configured to calculate multiple ray-tracing path reflections and refractions according to the method of claim 1.

17. An ultrasound imaging simulation system, comprising the ray tracer unit of claim 16.

18. A computer-implemented method for rendering, with a processor, a simulated ultrasound image, the method comprising:

identifying, for an incoming ray hitting a geometric surface on a 3D anatomical model at a geometric intersection point $P_{T0}$, at least one variable surface as a property of an underlying anatomy object tissue to characterize the surface as a partially diffuse surface;

calculating multiple ray-tracing paths from multiple intersection points $P_T$ distributed as a function of the variable surface parameter, with a stochastic ray-tracing method;

rendering the ultrasound image by combining one or more contributions from the calculated multiple ray-tracing paths, each calculated ray-tracing path being further attenuated as a function of an attenuation parameter $\alpha$ characterizing the underlying anatomy object tissue and of a penetrated distance l in the tissue.

\* \* \* \* \*